United States Patent [19]
Kang et al.

[11] Patent No.: US 6,256,058 B1
[45] Date of Patent: Jul. 3, 2001

[54] METHOD FOR SIMULTANEOUSLY COMPOSITING A PANORAMIC IMAGE AND DETERMINING CAMERA FOCAL LENGTH

[75] Inventors: Sing Bing Kang, Cambridge; Richard S. Weiss, Montague, both of MA (US)

[73] Assignee: Compaq Computer Corporation, Houston, TX (US)

[*] Notice: Subject to any disclaimer, the term of this patent is extended or adjusted under 35 U.S.C. 154(b) by 0 days.

[21] Appl. No.: 08/660,704

[22] Filed: Jun. 6, 1996

[51] Int. Cl.[7] .................................................. H04N 5/225
[52] U.S. Cl. ............................................. 348/207; 348/36
[58] Field of Search ..................................... 348/207, 177, 348/178, 180, 181, 187, 188, 36, 37, 38, 39, 345, 357, 335; 356/243; 250/201.2; 382/106, 284; H04N 5/225

[56] References Cited

U.S. PATENT DOCUMENTS 3,757,040 * 9/1973 Bennett et al. .......................... 348/36
4,549,208 * 10/1985 Kamejima et al. ...................... 348/36
5,200,818 * 4/1993 Neta et al. .............................. 348/36
5,262,867 * 11/1993 Kojima .................................... 348/39

* cited by examiner

Primary Examiner—Andrew I. Faile
Assistant Examiner—Tuan V. Ho
(74) Attorney, Agent, or Firm—Hamilton, Brook, Smith & Reynolds, P.C.

(57) ABSTRACT

In a computerized image processing system, a camera acquires a set of images of a scene while rotating the camera about an axis passing through an optical center of the camera. The images of the set overlap each other. An initial estimate of the focal length of the camera is made. The initial focal length can be any reasonable focal length. Using the initial estimate of the focal length, the set of images are composited in a memory to determine an estimated initial composited length. A next best estimate of the focal length is derived from the initial estimated composited length. The set of images are recomposed using the next best focal length estimate. This process is iterated until the absolute difference between the successive estimates of the focal length is less than a predetermined threshold to calibrate the camera. In addition, the process of compositing the set of images can use a weighted interpolation scheme to reduce the blurring effects caused by noise and digitization effects and incorrect focal length.

10 Claims, 7 Drawing Sheets

METHOD FOR SIMULTANEOUSLY COMPOSITING A PANORAMIC IMAGE AND DETERMINING CAMERA FOCAL LENGTH

FIELD OF THE INVENTION

This invention relates generally to image processing, and more particularly to compositing images made by an uncalibrated camera.

BACKGROUND OF THE INVENTION

A panoramic scene spans the entire 360 degree horizontal field of view. Panoramic images of scenes have important applications in computerized visualization. Panoramic images give the viewer an impression of being immersed in the scene.

A panoramic image can be generated by first taking a set of overlapping images of the scene while rotating a camera about a vertical axis which passes through the optical center of the camera. The set of images, if not already in digital form, can be digitized and processed to improve quality. The processed images can be projected onto a cylindrical surface for viewing. Alternatively, the images can be viewed using, for example, a head-mounted viewing device which simulates the cylindrical surface as the head is rotated. This virtually gives the viewer a sense of observing a real scene. In order to properly process and project the set of images, the focal length of the viewing system, e.g., the cross-sectional radius of the surface of the viewing cylinder, must substantially correspond to the focal length of the camera.

In the prior art, the focal length ($f$) of the camera is usually known. The focal length of the camera can be determined by calculating the distance between the image plane and the optical center of the camera. This can be done through the process of camera calibration.

Some calibration methods take images of calibration patterns such as regularly spaced dots or lines having known dimensions. Other methods take images of structures having constrained and known shapes, for example spheres or cubes. These methods have the disadvantage of requiring explicit feature extraction. In addition, these methods are not practical if the focal length of the camera is known to drift over time, or change with zooming or focussing.

In methods that involve a set of images taken while rotating the camera 360 degrees, feature tracking can be used on the set of images to recover the focal length. In some methods, translation estimates are made of a local area in the vicinity of the center of the images. This method requires small incremental steps while panning the camera. Another method requires explicit feature extraction, such as corners and edges, and tracking the features from one image to the next.

It is desired to automatically determine the focal length of a camera using a set of images without using special calibration set-ups and without explicit feature detection and tracking. Then, using the correct focal length, it becomes possible to create a panoramic view of the images that is both optically correct and seamlessly blended.

SUMMARY OF THE INVENTION

Disclosed is a method for calibrating a camera while extracting and compositing a panoramic image. A conventional commercially available camera, either analog or digital, is coupled to a computerized image acquisition and processing system. The camera acquires a set of images of a scene while rotating the camera about a vertical axis passing through the optical center of the camera. The images of the set are taken such that successively captured images overlap each other. The axis of rotation of the camera is substantially perpendicular to the focal axis of the camera to acquire images of a full 360 panoramic scene.

An initial estimate of the focal length of the camera is made. This estimate can be substantially smaller or larger than the true focal length. For example, the initial focal length can be estimated to be infinity. The set of images are composited by the image processing system to determine an initial composited length using the initial estimate of the focal length. The initial composited length is used to derive a next estimate of the focal length.

The images are recomposited using the next estimate of the focal length to determine a next composited length. This process is iterated until the absolute difference between a next and current estimates of the focal length is less than a predetermined threshold to substantially approximate the accurate focal length of the camera.

Prior to compositing, pixels of planar images are first projected onto pixels of a cylindrical surface having a cross-sectional radius that is the initial focal length estimate. If the initial focal length estimate is different from the actual focal length, then the length of the composite image will not be equal to the length of the circumference of the cross-sectional cylindrical surface. The net angular difference between the two lengths can be used to iteratively improve the estimate of the focal length.

The panoramic image may be blurred as a result of camera noise, digitization, image interpolation, and incorrect focal length. While generating the panoramic image, a weighted interpolation scheme can be used to significantly reduce the blurring effects in the panoramic image. In this scheme, the contribution of pixels of an image to the final composited panoramic image is reduced in proportion to the distance that the pixels are away from a central column of the image.

The method disclosed can be used either as a stand-alone technique to calibrate a camera, or as a technique to composite a panoramic image from a set of images with no prior knowledge of the camera focal length.

DETAILED DESCRIPTION OF PREFERRED EMBODIMENT

Figure 1:
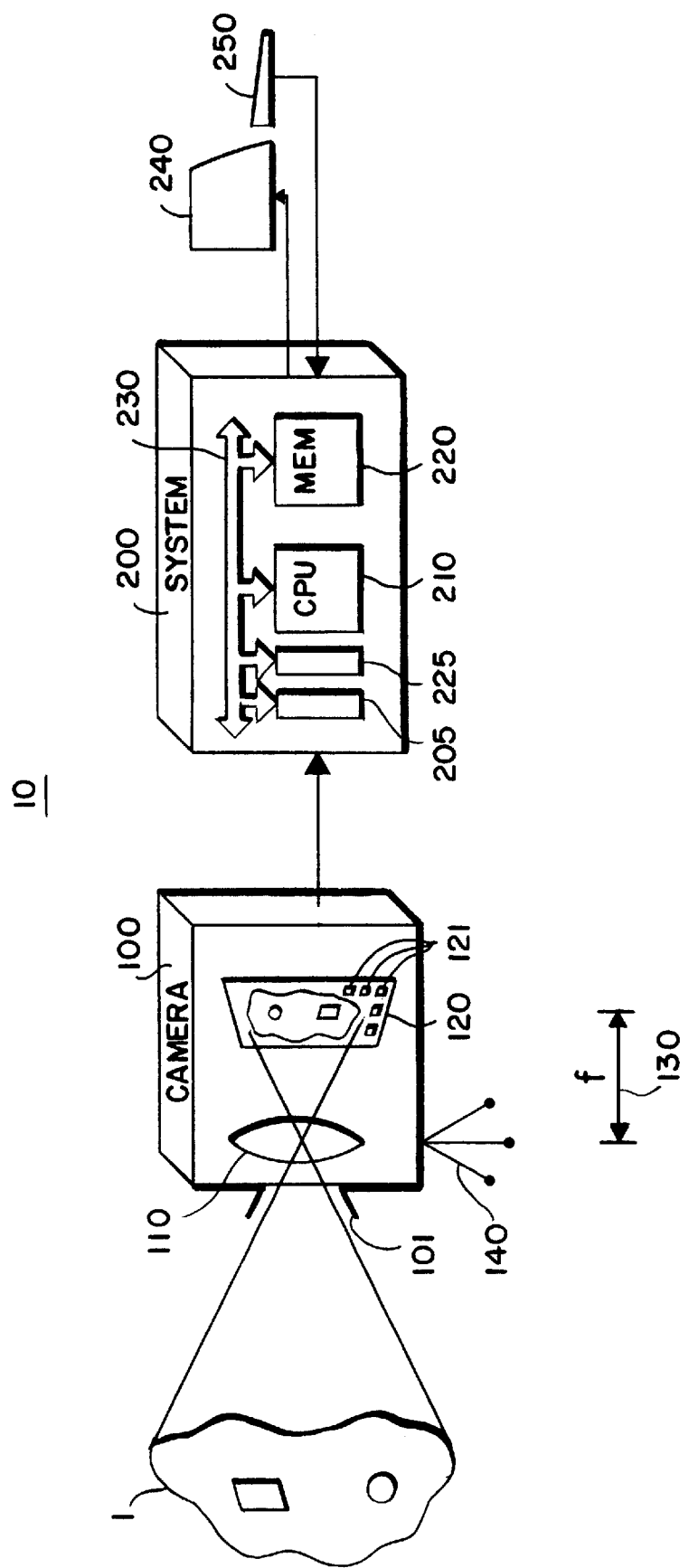
FIG. 1 is a block diagram of a system which uses the compositing and calibrating method of the invention.

FIG. 1 shows an automatic camera calibration and panoramic image compositing system 10. A camera 100 is coupled to an image acquisition and processing system 200. The camera 200 can be an analog camera, such as a camcorder, or a digital camera. The camera 100 includes an aperture 101, a lens 110, and an imaging plane 120. The imaging plane 120 can be in the form of a CCD chip which comprises a plurality of individual sensors 121 arranged in a regular pattern, e.g., rows and columns, of picture elements (pixels). Pixels on the same row compose a scan line. The camera 100 is mounted on an x-y precision stage of a tripod 140.

The image processing system 200 includes an image digitizer or frame grabber 205 (used only if the camera is an analog camera), a central processing unit (CPU) 210, a memory 220, and disk storage 225 all connected by a bus 230. Connected to the system 200 are an output device 240 and an input device 250. The output device 240 can be an image display unit such as a projector, monitor, or a head mounted device. The input device 250, for example, a keyboard or a mouse, can be used to control the system 200.

During operation of the system 200, an image of scene 1 is acquired by the camera 100 and digitized by the image digitizer 205. A set of images is obtained by successively capturing and digitizing a sequence of images. The digitized images can be stored in either the memory 220 or the disk storage 225. Image processing procedures executed by the processor 210 operate on the set of images stored in memory 220. If the images are initially stored in disk storage 225, then they must be first read into memory 220.

In order to correctly process the stored images, it is necessary to know a scaled distance 130 between the optical center of the camera 100 and the imaging chip 120. If the horizontal spacing between pixels in the imaging chip is taken to be as a unit distance, the scaled distance 130 is known as the focal length $f$.

Figure 2:
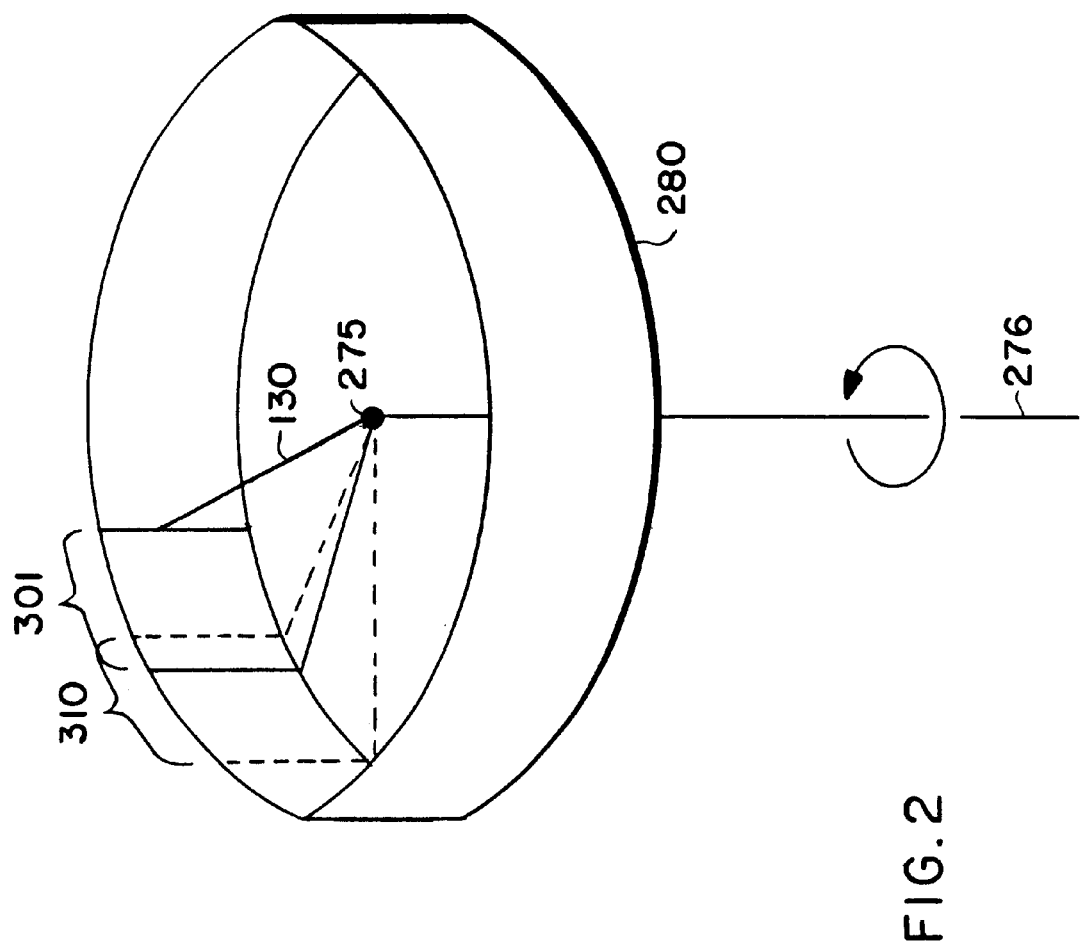
FIG. 2 is a panoramic view generated by composited images.
Figure 3:
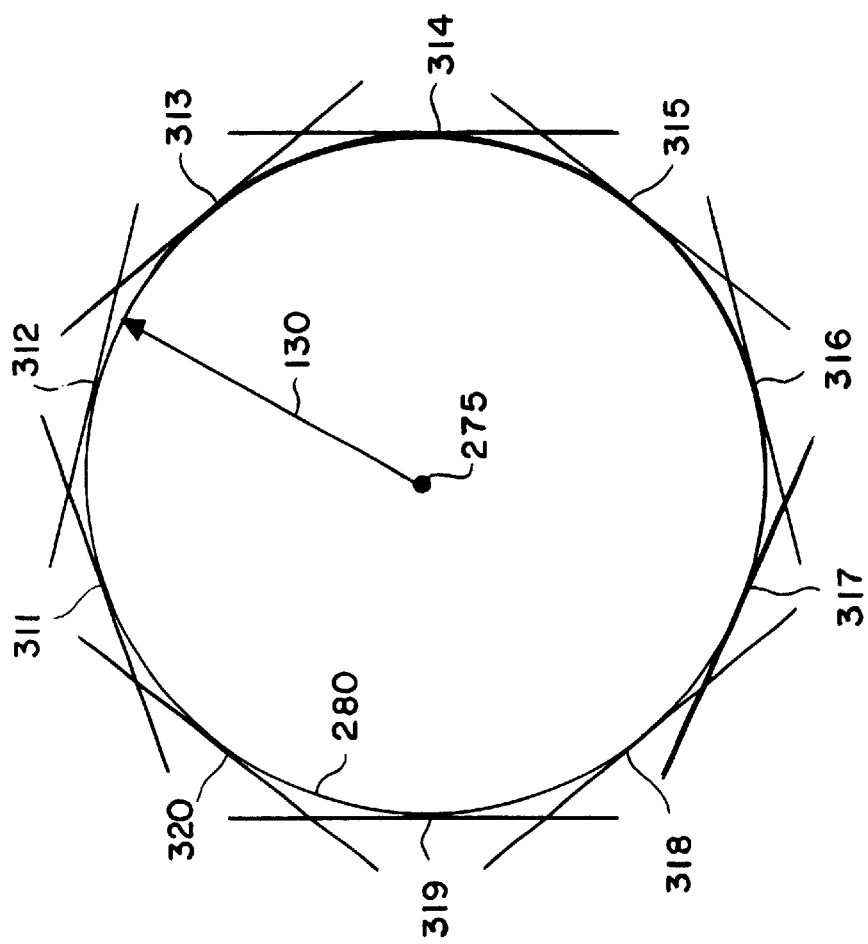
FIG. 3 is a top view of the panoramic view of FIG. 2.

As shown in FIGS. 2 and 3, it is desired to compose, for example, a full 360 degree panoramic view 280 of cylindrical images 301–310 using a set of planar images 311–320 as shown in FIG. 3. The planar images 311–320 are generated by rotating the camera 110 such that successively taken images of the set overlap with each other. To ensure that motion parallax is substantially eliminated, the camera 100 is rotated about an axis 276 which passes through the optical center 275 of the camera. In addition, the axis 276 is substantially perpendicular to the focal axis of the lens 110.

The optical center 275 can be determined by positioning the camera 100 on the x-y precision stage of the tripod 140 of FIG. 1, and adjusting the position of the camera 100 until the motion parallax effect disappears while the camera 100 is rotated back and forth.

The successively taken planar images 311–320 of the set overlap with each other, and the first image 311 overlaps with the last image 320. In acquiring the images, the ordering of the compositing is:

$$I_1, I_2, \ldots, I_k, \ldots, I_{N-1}, I_N, I_1$$

where $I_k$ is the kth image in the set, and N is the number of images in the set. The composited length is actually the displacement of the first image relative to its original location.

The panoramic view 280 can subsequently be rendered by determining the relative displacement between adjacent overlapping images in the set and compositing the displaced set of images.

If the radial distortion κ of the camera is significant, the images 311–320 are first corrected for radial distortion prior to compositing. This operation may not be necessary for images which have a small field of view, and where the radial distortion is minimal.

Subsequent to projecting the rectilinear planar images 311–320 to produce the cylindrical images 301–310, translation can proceed unidirectional, e.g., along the x-axis, since the set of rectilinear images are "flattened" or unrolled cylindrical images. This will be a correct process, since the camera motion has been constrained to rotate strictly about the y-axis 276 of FIG. 2 while the images 311–320 are acquired. The length of the panoramic view, e.g., the circumference of the cylindrical surface 280, is designated the composited length (L).

Successive planar images can be roughly aligned using a phase correlation technique, which involves image frequency analysis. During subsequent fine alignment, intensity differences between overlapping successive images can be minimized by iterative local refinements.

If the focal length 130 of the camera 100 is exactly known, then any error in the composited length L is due to effects such as camera noise and digitizing or resampling. In addition, a limit in the number of iterations processed during local alignment, and computer round-off effects can also contribute to the error. The rough alignment of the set of images 311–320 can be made more robust by adding an iterative step of checking displacements of pixels for corresponding peak intensity values. If the root-mean-square (RMS) error is high while matching the overlap region, then a peak can be marked as a false peak, and a next highest peak can be chosen instead.

Compositing errors can also occur if the wrong value for the focal length is used while converting the discrete rectilinear images acquired by the camera to cylindrical images suitable for panoramic viewing. If the correct focal length is $f_{true}$ then the expected length of the composited images is:

$$L = 2\pi f_{true}.$$

However, if the focal length is incorrect, then the mapped set of cylindrical images is no longer physically correct and the panoramic view will be rendered erroneously. Though the alignment and compositing processes may minimize the error in the overlap region of the successive images, the erroneous focal length will still produce a net error in the true composited length L.

In order to determine the true focal length of the camera, it is appropriate to consider a single scan line of each image, e.g., a row of pixels, since all of the pixels of a particular column of the rectilinear images are identically projected onto a corresponding column of pixels of the cylindrical images. During the projection, translation is constrained to be along the x-axis of the images.

If the images are "fully textured," matching between corresponding pixels of overlapping portions of different images will be unambiguous. Fully textured means that there are discernable variations in the intensity values of adjacent pixels. In a preferred embodiment, the degree of camera rotation between successive images is constant, although other applications may permit variable amounts of rotations.

The net translation from one cylindrical image to the next can be determined by minimizing the sum of the squares of the pixel displacements from their matching locations. In other words, after translation with interpolation, the pixels in a second image will not exactly match the pixels of a first image at a same location. Instead, each pixel of the second image will match a pixel at a displaced location. The translation which minimizes the sum of the squares of the displaced error is the one with an average zero displacement.

Figure 4:
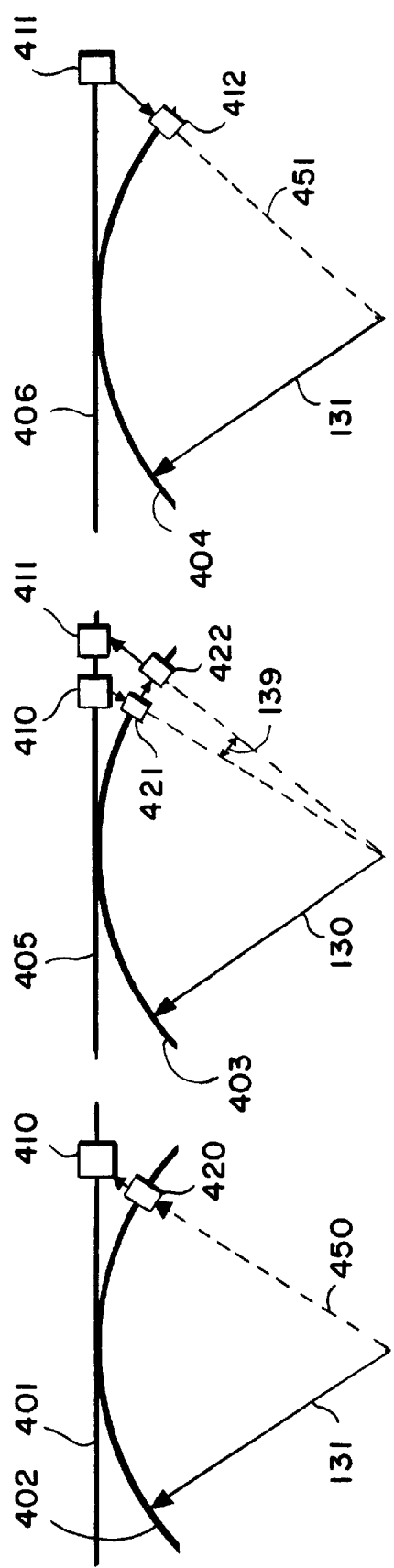
FIGS. 4A–4C are maps between cylindrical and rectilinear images.

In order to demonstrate that the process of iteratively recomputing the focal length and compositing length converges, a technique which determines the theoretical angular displacement can be used. FIGS. 4A–4C illustrate the steps of this technique which uses a current estimate of the focal length 131 ($f_k$), which may be inaccurate, and the true focal length 130 ($f_{true}$), which is assumed to be known for the purpose of the analysis. Note, not all of these steps need to be performed in a practical implementation of the invention.

Consider two rectilinear images 401 and 406 with different angular orientations of the camera. The angular displacement can be expressed by:

$$\alpha = 2\pi/N,$$

where N is the total number of images 311–320 in the set of images in FIG. 3 which form the complete panoramic view 280. Prior to image alignment, these two rectilinear images 401 and 406 are respectively projected onto cylindrical surfaces 402 and 404.

If the true focal length is known, e.g., the special where $f_k = f_{true}$, then the expected displacement between the cylindrical images 402 and 404 after alignment is precisely $\alpha$. If the focal length is not exact, which is usually the case, then the displacement after image alignment is different from $\alpha$. FIGS. 4A–4C show how to determine the error in image displacement after alignment due to error in focal length.

As shown in FIG. 4A, a pixel 420 is first projected from the cylindrical surface 402 to a pixel 410 of the rectilinear image 401. As shown in FIG. 4B, pixel 410 is then projected to pixel 421 of an intermediate cylindrical surface 403. The radius of the intermediate cylindrical surface 403 is the correct focal length $f_{true}$ 130. Pixel 421 is then shifted by the angle $\alpha$ 139 to pixel 422. Pixel 422 is projected onto pixel 411 located on the intermediate rectilinear surface 405.

Finally, as shown in FIG. 4C, pixel 411 is projected onto pixel 412 of the cylindrical surface 404 with the incorrect focal length ($f_k$) 131. This focal length is the same as that in FIG. 4A. If the estimated focal length 131 is correct, the shift between pixels 420 and 412 would be exactly $\alpha$. The amount of deviation of the actual shift between pixels 420 and 412 from $\alpha$ indicates the deviation of the estimated focal length 131 from the correct focal length.

In practice, the cylindrical images 402 are formed by "warping" the rectilinear 401 images onto the cylindrical surface 280 of FIG. 2. The radius of the surface has an estimated focal length $f_k$. Therefore, the mapping between the pixels of FIGS. 4A–4C can be expressed by:

$$t_i = f_k \tan(u_i/f_k)$$

$$s_i = f_{true} \tan(\tan^{-1}(t_i/f_{true}) + \alpha)$$

$$v_i = f_k \tan^{-1}(s_i/f_k)$$

where:
- $u_i$ are the pixels 420 of the image 402,
- $t_i$ are the mapped pixels 410 of the image 401,
- $s_i$ are the displaced pixels 411 of the image 405,
- $v_i$ are the mapped pixels 412 of the image 404, and
- $\alpha$ is the angular displacement $2\pi/N$.

The blurring compositing effects of camera noise, digitization, image interpolation, and incorrect focal length can be reduced by using a weighted pixel interpolation scheme.

Figure 5:
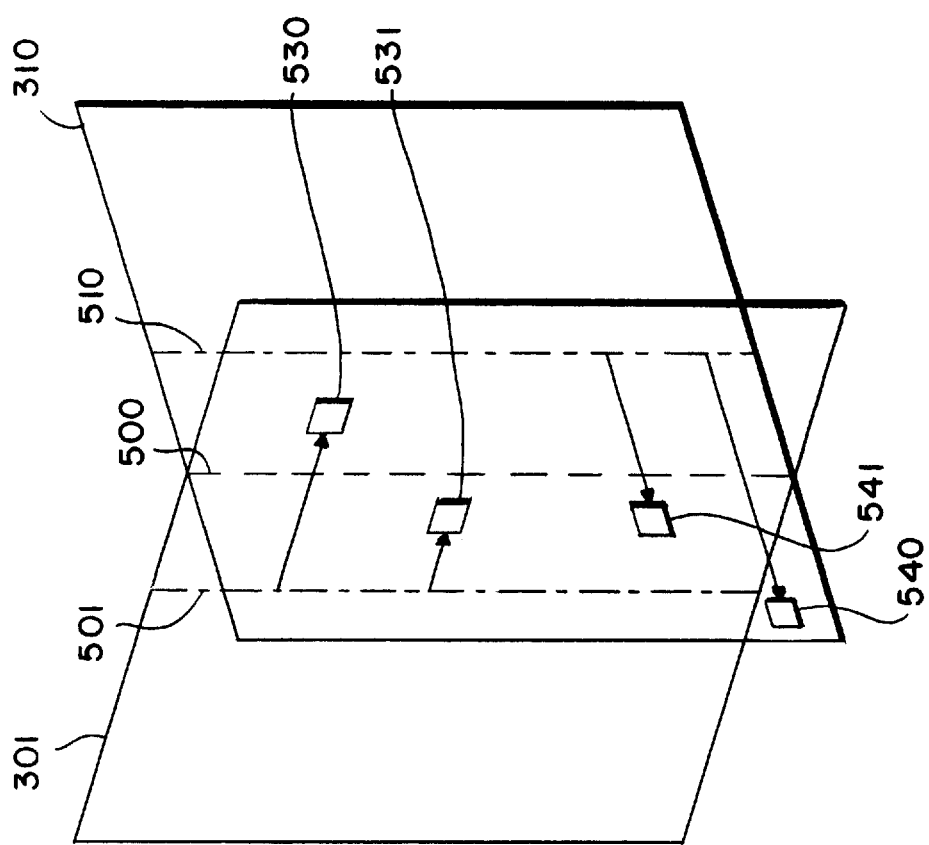
FIG. 5 shows central columns of overlapping images.

As shown in FIG. 5, while composing overlapping images, contributing pixels are weighted inversely proportional to how far they are from a central column of pixels 501 or 510, depending on which image 301 or 310, respectively, the pixel is selected from. For example, pixel 530, which is further away from the central column 501 of image 301, will contribute less to the resulting composite panoramic image, and pixel 531, which is closer, will contribute more. Similarly, pixel 540 of image 310 will contribute less than pixel 541. This is useful in improving the quality of the visual output of the panoramic image.

Also, near, but not necessarily at the line 500 of intersection between the two immediately adjacent images 301 and 310 the amount of displacement error between the images is the least. The relative error in the estimated composited length $L_k$ is much less than the relative error in the estimated focal length $f_k$. Thus, it is possible to reestimate the focal length based on the estimated composited length $L_k$ to get a next better estimate of the focal length, e.g., $f_{k+1}$. During successive iterations, the estimated focal length will converge to the true focal length.

It will be demonstrated that the convergence of the focal length is exponential in the vicinity of the true focal length. This is particularly true as the number of images N which compose the panoramic view is large. In practice, N is typically about 50. Specifically, if N is large, then:

$$|f_{true} - f_{k+1}| << |f_{true} - f_k|.$$

In words, this means that the error in the focal length for the second estimate is much less than the error produced by the first estimate. The absolute values are used because the estimates of the focal length can be greater or less than the actual focal length. The implication is that a reestimation of the focal length based on an estimated composited length yields a significantly better estimate. This observation can be used in an iterative image compositing process for camera calibration.

Figure 6:
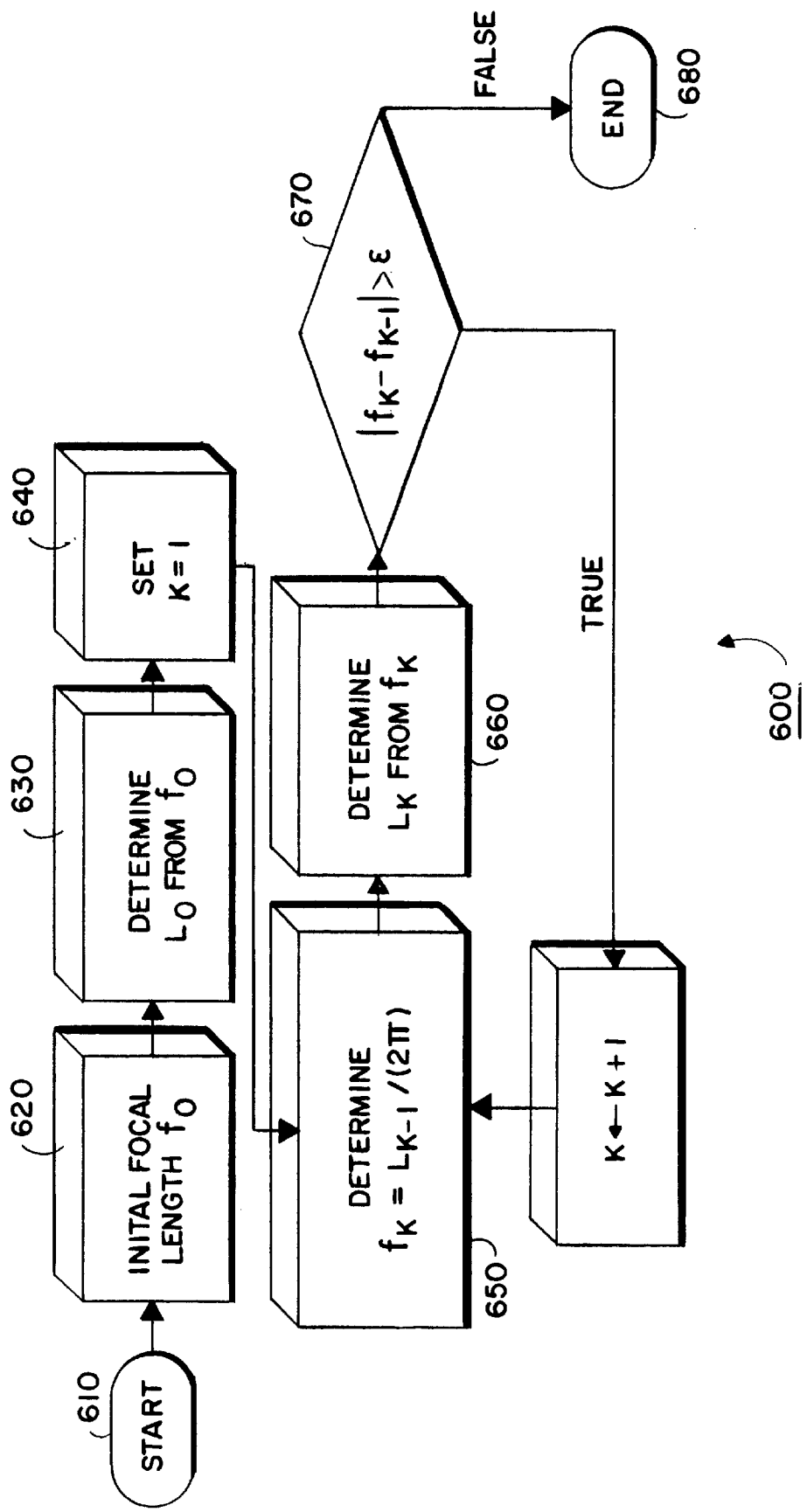
FIG. 6 is a flow diagram of a process for calibrating a camera.

As shown in FIG. 6, beginning in step 610 of a process 600, make an initial estimate of the focal length to be $f_0$ in step 620. Estimate an initial composited length $L_0$ from $f_0$. Set an iterative value k to 1 in step 640. The estimated focal length $f_0$ 130 can have any reasonable value up to infinity. For example, the estimated focal length $f_0$ can be 500, 2000, or larger. In other words, the surface 280 can be estimated to have a minimal amount of curvature or to be substantially planar or flat.

In step 650, determine a next estimate $f_k$ the focal length from the previous estimate of the composited length; in the first iteration, $L_{k-1}$ will be $L_0$. In step 660, determine a next composited length $L_k$ from $f_k$. In step 670, determine if the difference between the previous and next estimate of the focal length is greater or equal than some predetermined threshold value $\epsilon$. If this is true, repeat steps 650, 660, and 670, otherwise, the last value of $f_k$ is the final estimated focal length of the camera 100, and terminate in step 680.

The rate of convergence of $f_k$ towards $f_{true}$ can be expressed as:

$$f_{true} - f_k = \eta(f_{true} - f_{k-1}),$$

where $\eta$ is a computable constant dependent on the number of images N in the set and the true focal length. The constant $\eta$ has a value which is much less than 1 for a large N. This rate can be rearranged as:

$$f_k - \eta(f_{k-1}) = (1 - \eta)f_{true},$$

which has a solution of:

$$f_k = f_{true} + (f_0 - f_{true})\eta^k.$$

For example, if N=50, L=232, and $f_{true}$=274.5, then $\eta$=0.117. Hence, the convergence of the estimated focal length is exponential in the vicinity of the true focal length. Convergence is faster if the number of images increases, since $\eta$ decreases when N increases.

Figure 7:
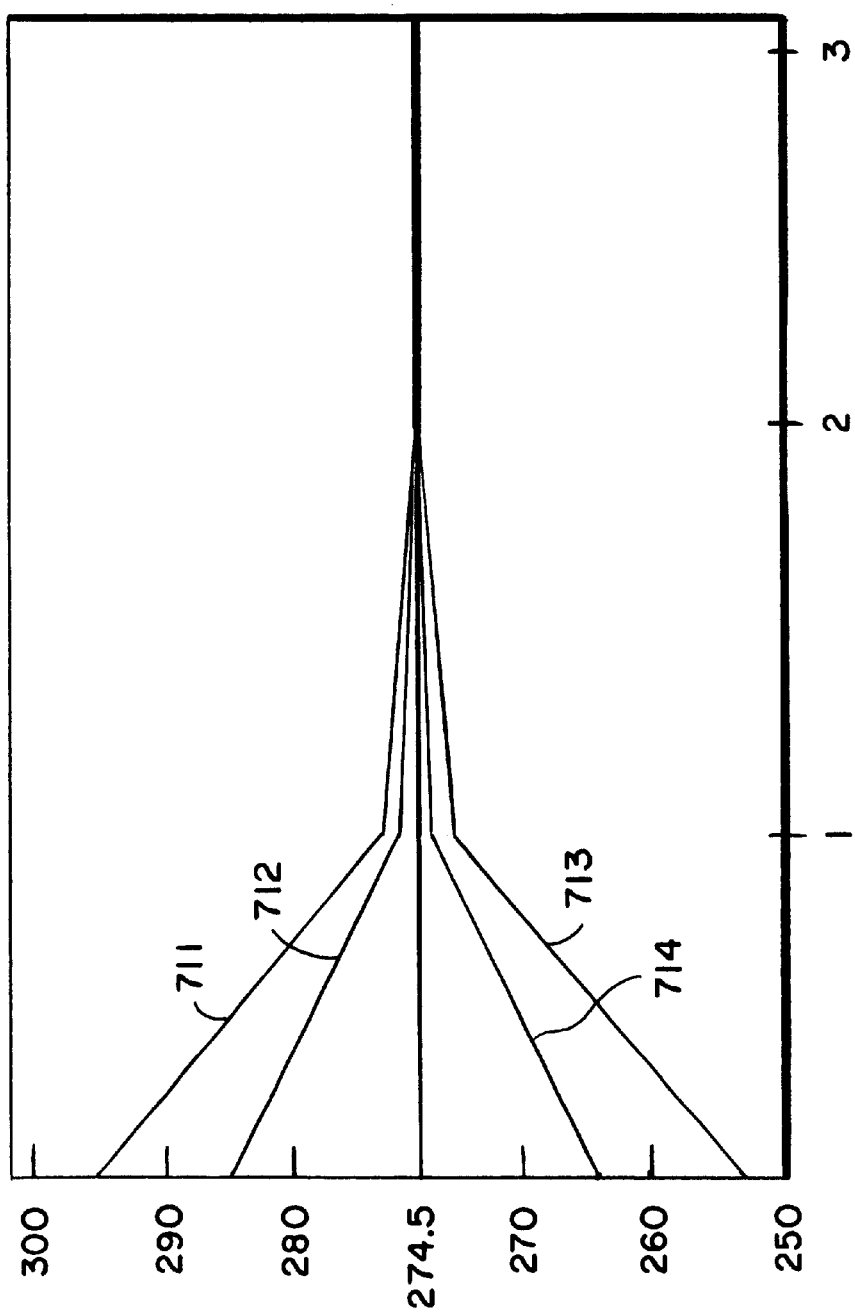
FIG. 7 is a graph of the convergence of the estimated focal lengths.

FIG. 7 shows the convergence to the final focal length from different initial estimates. In FIG. 7, the x-axis indicates the number of iterations, and the y-axis shows the estimated focal length. In the example shown, the true focal length is 274.5. The initial estimates of the focal lengths for lines 711–714 are respectively 294, 284, 264, and 254. Therefore, in actual practice, the estimated focal length converges on the true focal length in two to three iterations. When the initial estimate is infinity, the values of focal length assumed as a function of the iteration number are: infinity, 281.18, 274.40. It virtually converges in two iterations.

The present technique is based on the discovery that the relative error in the estimated composited length of a panoramic view is disproportionally much less than the relative error in an estimated focal length used to generate the view.

It should be understood that an estimate of the focal length can also be recovered using a different number of images, or a set of images which only span a portion of the panoramic scene. In this case, the formulation:

$$L = 2\pi f_{true}$$

is replaced by:

$$L = \beta f_{true}.$$

where $\beta$ is some angle in radians in the range of $0 < \beta \leq 2\pi$. Note that $2\pi$ radians is equivalent to 360 degrees.

In a more complex calibration system, the camera can be used to acquire a set of images representing part or all of a spherical scene. In this case, the set of images which overlap each other are to be projected onto a spherical viewing plane. The scene can be acquired by swiveling the camera about the optical center of the camera. The steps of estimating an initial focal length, and compositing a spherical composited length can be performed to produce a better estimate of the focal length until iterated estimates converge as above.

Those familiar with the art will appreciate that the invention may be practiced in other ways while still remaining within the scope and spirit of the appended claims.

What is claimed is:

1. A computer implemented method for calibrating a camera comprising:

acquiring a set of planar images of a scene while rotating the camera such that the planar images of the set overlap each other;

estimating a current focal length of the camera;

compositing the set of planar images in a memory of a computer to determine a current composited length of a set of cylindrical images using the current focal length;

deriving a next focal length from the current composited length;

recompositing the set of images in the memory to determine a next composited length using the next focal length;

selecting the next focal length as the focal length of the camera if the absolute difference between the next focal length and the current focal length is less than a predetermined threshold.

2. The method of claim 1 further comprising:

iterating the deriving and recompositing steps by assigning the next focal length as the current focal length until the absolute difference between the next focal length and the current focal length is less than the predetermined threshold.

3. The method of claim 1 further comprising:

arranging pixels for acquiring the set of images at the focal plane of the camera in regularly spaced rows and columns having a unit distance.

4. The method of claim 1 further comprising:

rotating the camera about an axis passing through the optical center of the camera.

5. The method of claim 4 further wherein the axis of rotation is substantially perpendicular to the optical axis of the camera.

6. The method of claim 5 further comprising:

rotating the camera to acquire a full 360 degree panoramic view of the scene.

7. The method of claim 1 further comprising:

estimating the current focal length of the camera to be a value larger or smaller than a correct focal length of the camera.

8. The method of claim 1 further comprising:

rotating the camera through an arbitrary angle which if offset for each image of the set to enable overlap between successively taken images.

9. The method of claim 1 further comprising:

using a weighted interpolation scheme in compositing the cylindrical images to reduce the blurring effects of camera noise, digitization, image interpolation, and the estimated current focal length.

10. The method of claim 9 wherein a particular pixel is weighted inversely proportional to a distance of the particular pixel from a central column of pixels of a particular image of the set.

* * * * *